United States Patent [19]

Funk

[11] Patent Number: 4,513,573

[45] Date of Patent: * Apr. 30, 1985

[54] SYSTEM FOR TREATING AND RECOVERING ENERGY FROM EXHAUST GASES

[76] Inventor: Harald F. Funk, 68 Elm St., Murray Hill, N.J. 07974

[*] Notice: The portion of the term of this patent subsequent to Oct. 25, 2000 has been disclaimed.

[21] Appl. No.: 530,650

[22] Filed: Sep. 9, 1983

Related U.S. Application Data

[63] Continuation of Ser. No. 205,348, Nov. 10, 1980, Pat. No. 4,411,136, and a continuation-in-part of Ser. No. 962,103, Nov. 17, 1978, Pat. No. 4,265,088, which is a continuation-in-part of Ser. No. 674,219, Apr. 6, 1976, Pat. No. 4,126,000, which is a continuation-in-part of Ser. No. 565,045, Apr. 4, 1975, Pat. No. 3,970,524, which is a continuation-in-part of Ser. No. 486,562, Jul. 8, 1974, abandoned, which is a continuation-in-part of Ser. No. 252,610, May 12, 1972, abandoned.

[51] Int. Cl.³ .......................... F01K 21/00; F01K 3/00
[52] U.S. Cl. ..................................................... 60/648
[58] Field of Search ................. 60/648, 655, 659, 670; 165/4

[56] References Cited

U.S. PATENT DOCUMENTS 4,411,136  10/1983  Funk .................................... 60/648

Primary Examiner—Allen M. Ostrager
Attorney, Agent, or Firm—Sixbey, Friedman & Leedom

[57] ABSTRACT

A method and apparatus for treating hot exhaust gas to purify the gas and/or to recover the heat values therein includes removing particulate matter from the gas, cooling the gas by transferring its heat to regenerators and purifying the cooled gas by subliming or "freezing out" harmful, less volatile components. The heat energy of the exhaust gas may be recovered by passing a heat exchange medium, such as compressed air and/or purified cooled gas, through the heated regenerators. A major advantage of this method and apparatus is that exhaust gases at 300°–350° C. may be purified and the heat energy recovered using thermodynamically efficient regenerators. As a result the air preheater stage of conventional boilers or combustion units, which comprise 60% to 70% of the heat exchange surface area, may be eliminated.

6 Claims, 5 Drawing Figures

SYSTEM FOR TREATING AND RECOVERING ENERGY FROM EXHAUST GASES

CROSS REFERENCE TO RELATED APPLICATIONS

This application is a continuation of application Ser. No. 205,348, filed Nov. 10, 1980, now U.S. Pat. No. 4,411,136.

The present application is a continuation-in-part of application Ser. No. 962,103, filed Nov. 17, 1978 (now U.S. Pat. No. 4,265,088), which application was a continuation-in-part of application Ser. No. 674,219 filed Apr. 6, 1976 (now U.S. Pat. No. 4,126,000), which application was a continuation-in-part of application Ser. No. 565,045, filed Apr. 4, 1975 (now U.S. Pat. No. 3,970,524), which application was a continuation-in-part of application Ser. No. 486,562, filed July 8, 1974 (now abandoned), which application, in turn, was a continuation-in-part of application Ser. No. 252,610, filed May 12, 1972 (now abandoned), the disclosures of which are incorporated by reference.

BACKGROUND OF THE INVENTION

1. Field of the Invention

The present invention relates generally to the treatment of exhaust gases for discharge to the atmosphere, and more particularly to methods and apparatus for treating and recovering energy from hot exhaust gases.

Exhaust gases suitable for treatment by the system of the present invention include combustion exhaust gases produced in fuel burning furnaces, roasters and the like, exhaust gases such as those produced in cement kilns and the like, and exhaust gases containing such components as nitrogen, carbon dioxide, carbon monoxide, hydrogen chloride, hydrogen sulfide, hydrocarbon gases, and the like. The exhaust gases are preferably essentially inert but include noxious components and traces of combustible gases.

2. Prior Art

Hot exhaust gases generated during the combustion of fuel have commonly been disposed of by exhausting them to atmosphere through tall chimneys or stacks. Disadvantages of this method of disposal include resulting air pollution and its harmful effects on the environment, a waste of recoverable heat energy, and the high cost of constructing and maintaining tall stacks. Loss of recoverable heat energy is unavoidable because gases discharged into a stack must be substantially hotter than ambient air to produce an up-draft in the stack and to avoid condensation in the chimney. Moreover, the latent heat of steam in flue gases is not generally recovered in order to avoid condensation and the attendant corrosion, as a result of which additional, available heat energy is being wasted.

Where the latent heat of steam is not recovered, the system designer must work with "low heating values" of the fuels rather than "high heating values". Low and high heating values for fuels are given in such handbooks as the John N. Perry *Engineering Manual,* published in 1959 by McGraw Hill, where the following typical heating values are given:

| Gas | High Heating Value | Low Heating Value |
| --- | --- | --- |
| Hydrogen | 60,958 Btu/lb | 51,571 Btu/lb |
| Methane | 23,861 Btu/lb | 21,502 Btu/lb |
| Methyl alcohol (vapor) | 10,270 Btu/lb | 9,080 Btu/lb |

As will be apparent from these heating values, about 18 percent more Btu/lb can be recovered from hydrogen if its high heating value can be utilized, about 11 percent more from methane, and about 13 percent more from methyl alcohol vapor. Prior systems have not been able to utilize the high heating value of such gases.

As the public concern about air pollution has increased, stack heights have been increased to affect better dispersion of pollutants. However, increasing stack height adds to the cost of constructing and maintaining stacks, yet provides no solution to the underlying problem, i.e., avoiding emission in the first instance of harmful substances such as sulfur oxides, chlorine gases, phosphor oxides, etc.

A significant factor in air pollution is the increasing level of gaseous airborne pollutants which combine with moisture in the air to produce acids, e.g. carbon dioxide, sulfur dioxide, chlorine and fluorine. The carbon dioxide content in some industrial districts is as high as ten times normal. Acid forming pollutants have been found in some instances to increase the acidity of rainwater from its normal pH of about 6.9 to values of 4.0. Rainwater having a pH of 5.5 or less will destroy aquatic life and can do substantial harm to buildings, monuments, and other structures.

One proposal for removing acid forming components from exhaust gases is to scrub the entire flow of exhaust gases with water and caustic prior to discharging them through a stack. However, scrubbing the entire exhaust gas flow requires large quantities of water, which are not always available, and requires costly, large capacity scrubbing equipment. Indeed, scrubbing the entire flow of exhaust gases from some incinerators requires at least half the amount of water, by weight, of the solid wastes burned in the incinerator. Treating the large volume of scrub water needed in such a process is very costly and contributes to the impracticality of scrubbing as a total solution to the acid pollutant problem.

Another difficult pollutant to deal with effectively is sulfur in the flue gases. One proposal for the desulfurization of flue gas utilizes a series of heat exchangers to extract heat energy from the flue gas prior to a scrubbing operation. Heat extracted from the gas is returned to the gas following desulfurization and the gas is exhausted through a tall stack for diffusion into the atmosphere. This proposal has the disadvantages of wasting heat energy recovered from the gases, requiring large volumes of scrubbing water, requiring the use of a tall stack, and polluting the air with such noxious components as are not removed during scrubbing.

The problem of disposing of exhaust gases is now recognized as a major concern in industrial countries throughout the world. Dispersing emissions through the use of tall stacks is no longer regarded as an acceptable solution. Applicant's U.S. Pat. No. 3,970,524 discloses a system for gasification of solid waste materials and a method for treating the resulting gases to produce commercially useable gases in such a manner that dispersion through stacks is not necessary. A feature of one embodiment of this patent is pressurization of a combustion zone to such pressures as will permit blower and/or compression units to be eliminated from the gas treatment system. Another feature is the use of a multichamber gas treatment unit in which noxious gas components are sublimed or "frozen out" and thereby separated from the clean useable gas components. A problem not addressed by U.S. Pat. No. 3,970,524 is that of providing a system for treating combustion exhaust gases and productively reclaiming heat energy from the hot gases. This problem is, however, dealt with in applicant's U.S. Pat. No. 4,126,000 which teaches reclamation of heat energy by the transfer of the sensible and latent heat of the gases to a power fluid in indirect heat exchange relationship therewith, as in a conventional heat exchanger. However, the economics of indirect heat exchange at the lower temperature levels are very poor and reduce the over-all desirability of such a system. Applicant's U.S. Pat. No. 4,265,088, discloses a system which utilizes direct heat exchange between the hot gases and a power fluid to improve the economics and thermal efficiency of the system.

Notwithstanding the improvements in exhaust gas pollutant control and heat reclamation economics made possible by the systems disclosed in applicant's prior patents and copending application, a major problem not dealt with is the thermal inefficiency resulting from use of conventional combustion or other gas producing systems. A large amount of available power today is derived from fossil fuel fired furnace units which provide the thermal energy for steam generation in boiler units. In a conventional steam generating boiler system, preheated feed water is treated in a series of heat exchange sections to ultimately produce steam at the desired temperature and pressure for driving power generating steam turbines and the like. The boiler feed water is typically converted to high temperature, high pressure steam by initial heating in an economizer section, by subsequent passage through various superheater sections, often through a reheater section and subsequently through boiler convection and radiation sections. The fossil or manufactured fuel fired to produce the thermal energy which is transferred to the boiler feed water to produce the high temperature and pressure steam is converted to a hot exhaust gas which typically exits the furnace through an air preheater as its final stage. In this final stage, combustion gases having temperatures of about 300°-350° C. exchange their thermal energy with compressed ambient air with the result that the gases exhaust the unit at about 130° C. to 180° C. and the air is heated to about 200° C. The 130° to 180° C. exhaust gas is further processed to separate pollutants and reclaim heat values while the heated air is utilized, serving, for example, as the combustion air fed to the boiler or combustion unit. Air preheaters are well known to require from 60% to 70% of the boiler's heat exchange surface area and to operate at thermal efficiencies in the 50-60% range. See, Hicks, Standard Handbook of Engineering Calculations (1972). Accordingly, if the preheater could be eliminated without a corresponding loss in heat reclamation capacity, a substantial cost and energy savings could be achieved.

SUMMARY OF THE INVENTION

It is therefore an object of the present invention to overcome the foregoing economic and other drawbacks of the prior art, and to provide unique and improved methods and apparatus for purifying hot exhaust gases to remove harmful components therefrom and for recovering and using the thermal energy therein.

Another object is to provide unique and improved methods and apparatus for purifying at least 300° C. and preferably 300° to 350° C. exhaust gases and, thereby, permitting use of boilers or combustion units having substantially less surface area.

Still another object is to provide improved systems and methods for treating hot exhaust gases for removing harmful components and recovering heat energy therefrom to permit their discharge to atmosphere without the need for tall chimneys or stacks.

Other objects and advantages will become apparent from the following description and appended claims.

In accordance with the foregoing objects the present invention provides a method whereby hot exhaust gases, generally at about 300° to 350° C., which have not been subjected to a flow of cooling air such as typically occurs in a conventional air preheater, are treated by separating out solid particles, cooling in regenerators in heat-exchange relationship with solid materials having relatively high heat capacitance and relatively large surface area to volume ratios, processing to remove the noxious, generally less volatile components of the exhaust gas, and exhausting the resulting purified gases (generally comprising the more volatile components of the exhaust gas) to atmosphere without using a stack. The less volatile components, comprising the environmental pollutants, may be removed in known manner, preferably by subliming or "freezing out" such harmful, less volatile components of the gases for subsequent scrubbing, neutralization or utilization. Heat values in the hot exhaust gas are removed, at least in part, by cooling the gas in regenerators and recovered by passing a heat exchange fluid, preferably a gas such as steam, compressed air, or the like, through the regenerators. The resulting heated heat exchange fluid may be utilized for any purpose. However, if compressed air is used, the heated air is particularly suitable for use as the combustion air fed to the exhaust gas source, i.e., the boiler or combustion unit. The heat values remaining in the exhaust gas, if sufficient, may also be utilized, e.g., to heat water which, in turn, may be used for preheating boiler feed water, domestic heating or other purposes.

In one embodiment of the invention the exhaust gases, after removal of solid particles therefrom, are purified in regenerators, i.e., less volatile components are sublimed or condensed. The gases are cooled prior to subliming using regenerators as heat exchangers and transfer their heat to the packing of the regenerators. The cooled and purified gas may be used to reclaim a portion of the heat originally transferred to the regenerators. The balance of the heat energy of the gases is recovered from the regenerators by passing a heat exchange fluid, such as compressed air, therethrough. In another embodiment of the invention the exhaust gases are cooled, less volatile components are sublimed, purified gases are reheated and heat energy is reclaimed, all using a single pair of regenerators, i.e., each regenerator performs multiple functions. In still another embodiment a first plurality of regenerators arranged in series are used to perform the cooling and gas purifying functions and a second plurality of regenerators arranged in series are used to perform the purified gas reheating and heat reclamation functions.

One noteworthy advantage of the various systems of the present invention is that they are able to process hot exhaust gases, i.e., gases having a temperature of 300° C. or higher, obviating the need for the air preheater stage of conventional boiler and combustion units and thus effecting a savings of at least 60%–70% of the heat transfer surface area of such units. Heat reclamation is effected, instead, in regenerators which operate at a thermal efficiency of 90% or better compared with conventional boiler air preheaters which operate at thermal efficiencies in the 50–60% range. Another important advantage is that they also obviate the need for costly stacks. Still another advantage of the present invention is that the systems consume only a small fraction of their power output as compared with conventional systems which utilize up to 10% of their power output. Yet another advantage is that the systems of the present invention may, if desired, utilize a sublimation or "freezing out" process to separate out harmful, less volatile gas components which can then be recovered and treated for utilization or neutralized, as by scrubbing, with far less water than would be required if the entire flow of exhaust gases were to be scrubbed as in prior proposals. The small volume of scrub water required for this operation can be treated at minimal cost with scrubbing equipment having a much smaller capacity than is required where the entire flow of exhaust gas is scrubbed. Substantial savings are achieved over prior processes inasmuch as large capacity scrubbing equipment is not required. The ability to utilize smaller capacity equipment is important also from the standpoint of minimizing the amount of expensive corrosion resistant material needed. As is well known, all scrubbing systems experience a severe corrosion problem requiring the provision of expensive corrosion resistant materials. In the present systems, where small scale rather than large scale equipment can be used due to the limited scrubbing volume, the amount of expensive corrosion resistant material needed is minimized. If the exhaust gases are to be treated for utilization, an absorption or adsorption system can be applied which will yield a concentrated stream of $SO_2$ ready for use in the chemical process industry. Such utilization obviates the use of water for scrubbing in a neutralization system.

Gas treatment methods and apparatus of the type described in U.S. Pat. No. 3,970,524 may advantageously be used to effect a separation of harmful, less volatile exhaust gas components by the sublimation or "freezing out" process. The apparatus includes an arrangement of valve interconnected, packed, refrigerated towers through which exhaust gas passes to effect sublimation or "freezing out" of harmful components. Components which can be removed by this process include $CO_2$, $HCl$, $H_2S$, $SO_2$, $C_2H_2$, $HCN$, $SO_3$, and the like. It is noteworthy that this type gas treatment process is primarily of a physical nature. Chemical treatment is not utilized until noxious gas components, which comprise only a small fraction of the total gas flow, are separated out. A particularly useful aspect of this type of gas treatment is that it permits noxious gases from many sources to be treated concurrently, thereby obviating the need for several separate gas treatment apparatus installations. Off gases from refinery equipment and the like can be collected and transferred through a sewer-like system of conduits and treated at a single installation with apparatus embodying the invention.

Inasmuch as the system of the present invention provides a relatively simple and inexpensive method of purifying flue gases, it also permits the use of cheap fuels having a relatively high sulfur content. The savings which result from the use of cheaper fuels, the elimination of tall stacks, the ability to recover energy from the gases, the elimination of need for the air preheater section of boilers, the elimination of large uses of scrub water, and the reduction in size of required scrubbing equipment make the system economically attractive for installations of a wide range of sizes. Moreover, where the exhaust gases being treated contain a relatively high concentration of sulfurous compounds, elemental sulfur and/or sulfuric acid may be obtained from the compounds, thereby adding to the economy of operation of the system.

In the desired practice of the present invention, exhaust gases are generated in the firebox of a combustion system, and the firebox is operated under sufficient pressure to obviate the need for blowers and compressors in the exhaust gas treatment system. By pressurizing the combined combustion and gas treatment system with a compressor upstream of the combustion system, the need for compression equipment downstream from the combustion system is eliminated. However, as a practical matter, where large gas volumes are generated, the combustion system cannot maintain much of a positive pressure and at least one downstream compressor is generally necessary.

BRIEF DESCRIPTION OF THE DRAWINGS

A fuller understanding of the invention may be had by referring to the following description and claims taken in conjunction with the accompanying drawings in which:

DESCRIPTION OF THE PREFERRED EMBODIMENTS

Figure 1:
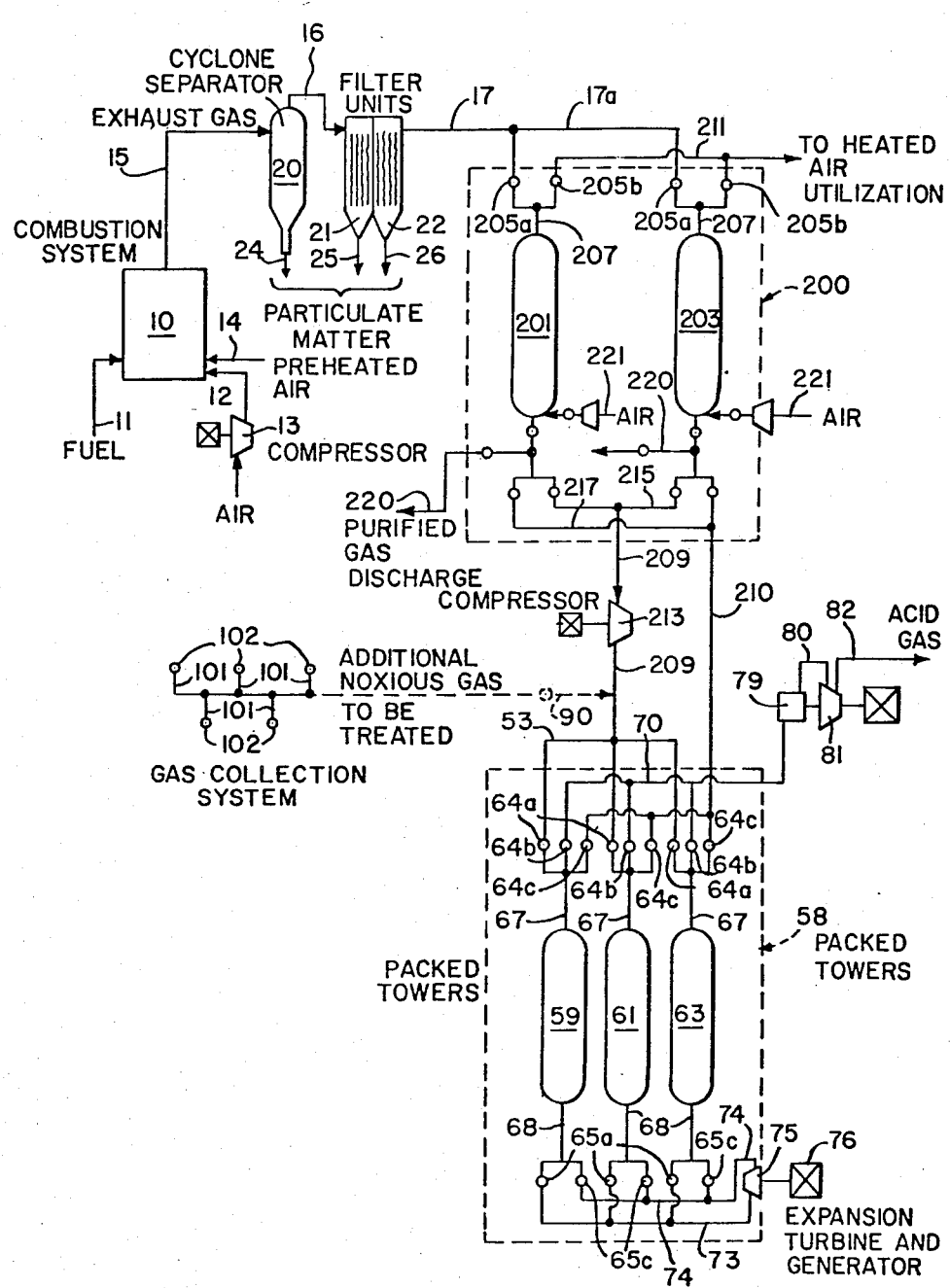
FIG. 1 is a schematic flow diagram of a system for practicing one embodiment of the present invention.
Figure 4:
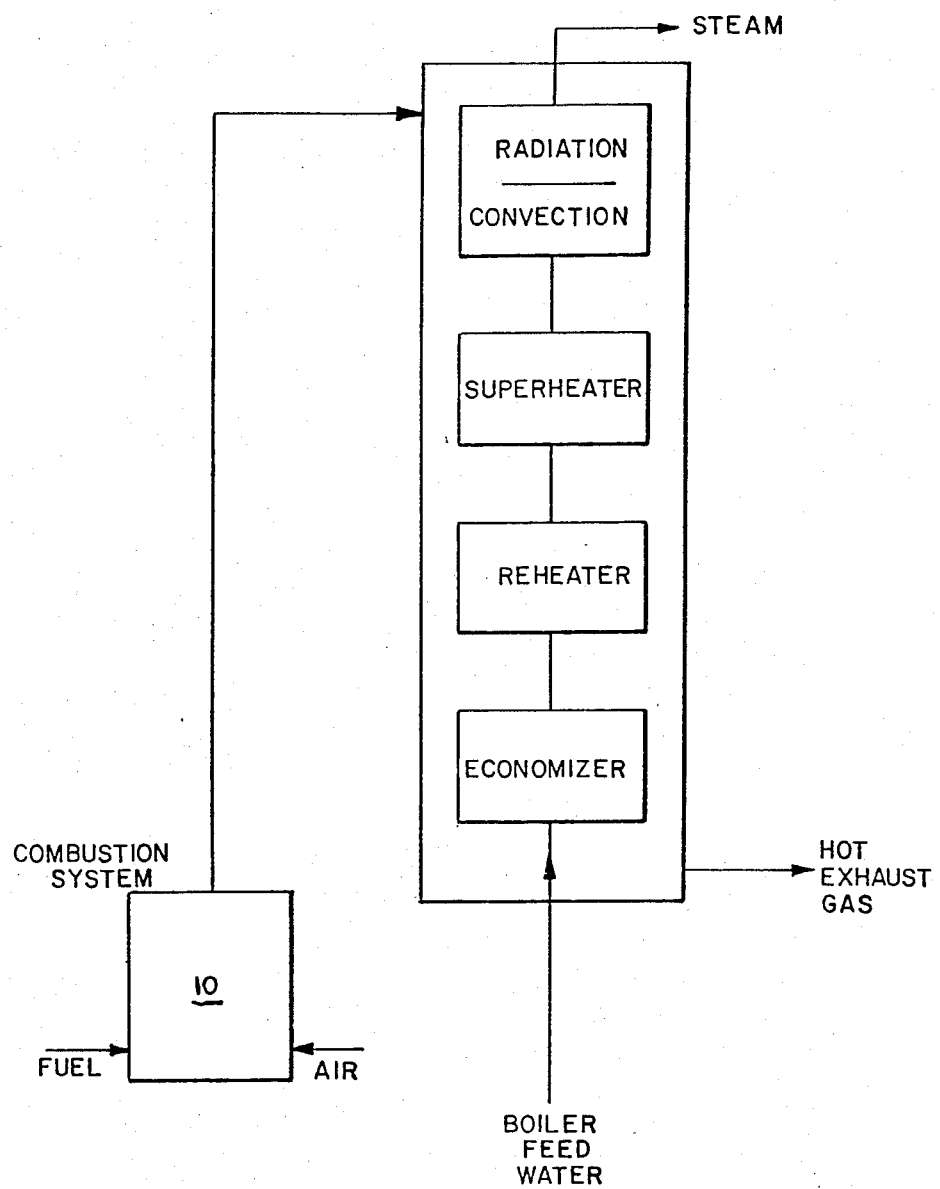
FIG. 4 is a block diagram of a hot exhaust gas producing combustion system in combination with a steam generating boiler for use in connection with the systems of the present invention.

Referring to FIG. 1, a combustion or other gas producing system is indicated generally by the numeral 10. The system 10 can include one or more fuel burning furnaces, roasters, cement kilns and the like which emit hot exhaust gases as a product of fuel combustion and/or other chemical process which discharge hot exhaust gases containing such components as nitrogen, carbon dioxide, sulfur dioxide, hydrogen chloride, hydrogen sulfide, carbon monoxide, nitrogen oxide, hydrogen cyanide, and hydrocarbon components. A typical combustion system in combination with a suitable steam generating boiler is illustrated in FIG. 4. It can be seen from FIG. 4 that the hot gases produced in combustion system 10 pass in heat exchange relationship with boiler feed water and steam in convection-radiation sections, superheater sections, reheater sections and economizer sections of steam boilers before being discharged for clean-up and/or heat reclamation to the systems of the present invention.

Fuel is supplied to the combustion system 10 as indicated by an arrow 11. In preferred operation, the fuel used in the system 10 is inexpensive solid or liquid fuel having a relatively high sulfur content. This fuel is preferred due to its low cost and because the sulfur content is easily separated out of exhaust gases as will be explained.

Air or oxygen enriched air is supplied to the combustion system 10 as indicated by an arrow 12. In preferred practice, a compressor 13 is used to pressurize the air supply 12 such that the combustion system operates under pressure. Where available, heated compressed air is supplied to combustion system 10 via air line 14. Depending on the magnitude of the pressure maintained in the system 10, one or more downstream gas compression units may be eliminated from the exhaust gas treatment system of the present invention, as will be explained. In a preferred form of the invention, the combustion system 10 is operated under sufficient pressure (at least about 28 psig) to obviate the need for blowers and compressors in the exhaust gas treatment system. By pressurizing the system with a compressor upstream of the combustion system 10, the need for compression equipment downstream from the combustion system is diminished or eliminated. As a practical matter, however, where the configuration of FIG. 1 is used in connection with very large exhaust gas volumes (e.g., 2,500,000 $Nm^3/hr$ or more), the combustion system cannot generally maintain much of a positive pressure. Therefore, at least one downstream compressor, such as compressor 213, is generally necessary.

Exhaust gases generated by the combustion system 10 are ducted via conduits 15, 16, 17 to, through and from a series of particle separation units 20, 21, 22. The separation unit 20 is preferably a cyclone separator, and particulate matter as small as 50 microns in size is separated out of the gases, as indicated by an arrow 24. The separation units 21, 22 house filters which remove smaller particles as indicated by arrows 25, 26. The units 20, 21 22 are insulated to avoid heat loss.

Exhaust gases which have been cleaned of particulate matter are ducted through feed conduit 17a into exhaust gas cooling and heat reclamation unit 200. Unit 200 is operable: (1) to cool the exhaust gases prior to ducting them to compressor 213 and gas treatment and separation unit 58 which may operate, for example, by separation of the cooled gas into condensable and noncondensable components by subliming or "freezing out"; (2) to receive the purified gases exiting gas treatment and separation unit 58 and to discharge or direct them to a point of utilization; and (3) to heat a heat exchange fluid, which for purposes of descriptive simplicity will be identified herein as compressed air, to within a few degrees of the temperature of the exhaust gases which entered unit 200 through feed conduit 17a. Unit 200 includes two similar packed towers or columns 201, 203. Each of the towers 201, 203 is similar in construction and content to the regenerators, described more fully hereinafter, shown as 59, 61, 63. Automatic switch valves 205a, 205b, are provided at the end of towers 201, 203 adjacent feed conduit 17a. Feed conduit 17a connects with the valves 205a. Tower connection conduits 207 communicate the towers 201, 203 with the valves 205a, 205b. Tower connection conduit 209 communicates the towers 201, 203 with feed conduit 53 of the gas treatment and separation unit 58. Purified gas return conduit 210 returns purified gas from unit 58 to unit 200. A heated air discharge conduit 211 connects with the valves 205b. A compressor 213 is included in tower connection conduit 209 to provide the positive pressure in the system which is almost invariably required when very large exhaust gas volumes are passed through the FIG. 1 system. Conduits 209 and 210 are cross connected through conduits 215 and 217 (which contain appropriate flow control valves) upstream of the compressor 213 to allow either tower 201 or 203 to function as the air heating or exhaust gas cooling tower.

The manner by which gases are treated in unit 200 may be visualized as that of subjecting the gases in successive like cycles to cooling in towers 201, 203. During each cycle, a different step is being conducted in each of towers 201, 203. While a first tower is serving as the cooling tower to cool the hot gases, the other tower is serving to heat the compressed air fed therethrough via air feed line 221. In the next cycle, the roles of the respective towers are reversed.

Figure 2:
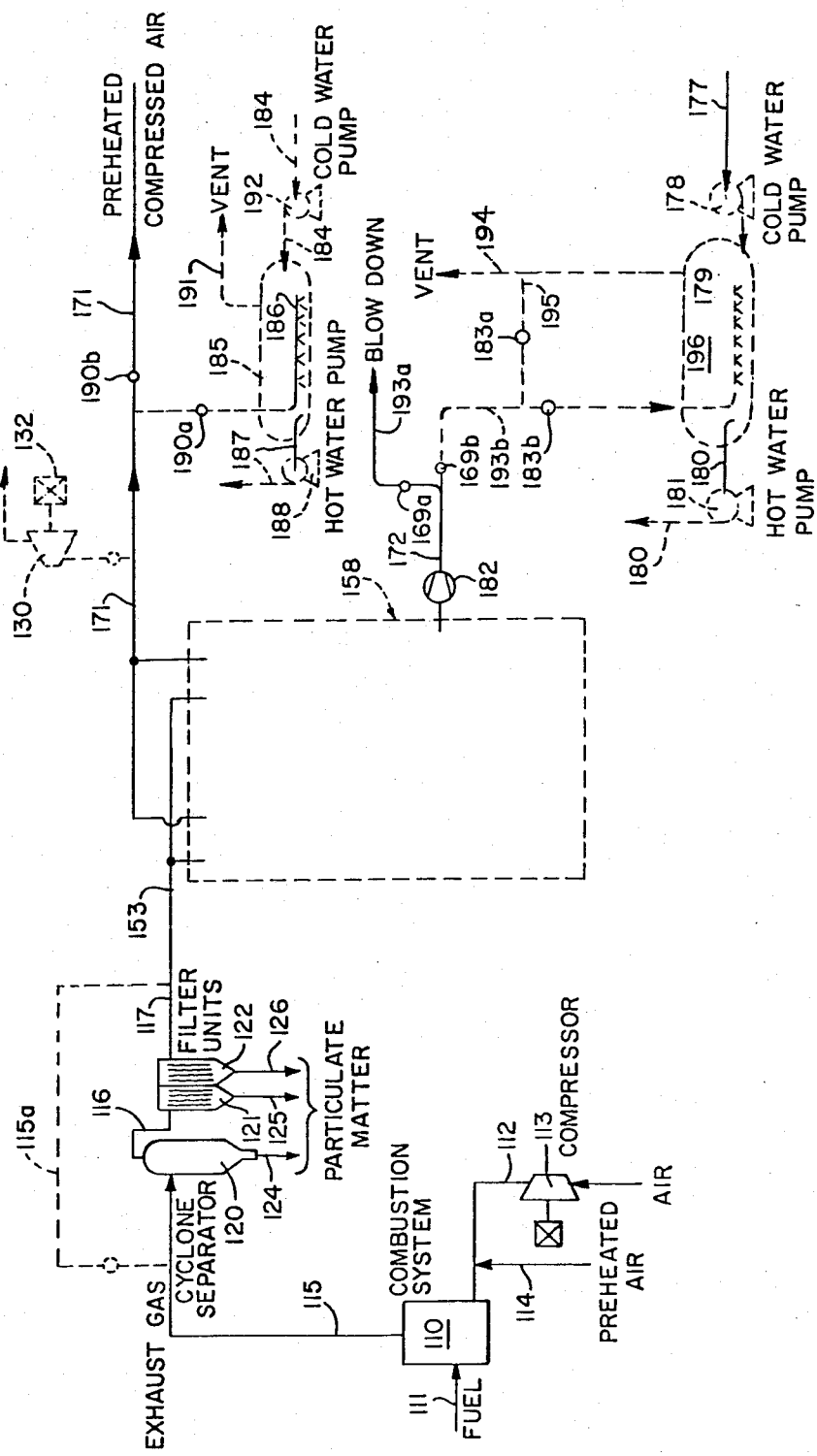
FIG. 2 is a schematic flow diagram of a system for practicing another embodiment of the present invention.

Thus in a first cycle one of the towers 201, 203 is selected as the cooling tower into which the hot particle free exhaust gases are ducted and the corresponding valve 205a is opened. If tower 201 is to serve as the cooling tower, valve 205a associated therewith and valve 205b associated with tower 203 are opened while valve 205b associated with tower 201 and valve 205a associated with tower 203 remain closed. The hot exhaust gases flow from feed conduit 17a through valve 205a into tower 201 in which the gases are cooled prior to compression in compressor 213. At the same time the tower 201 is heated by the hot gases in preparation for serving as the air heating tower in the next cycle. The compressed gases are directed via cross conduit 215 through conduit 209 to feed conduit 53 for processing in gas treatment and separation unit 58. If desired, other noxious gases may be mixed with the compressed exhaust gases entering conduit 209 (optional addition indicated by broken line 90). Following processing in unit 58, the purified gases leaving towers 59, 61, 63 through valves 64c are ducted via purified gas return conduit 210 through purified gas discharge conduit 220. The heat energy stored in tower 203 is recovered by passing compressed air through air feed line 221 into and through tower 203 in which the air is heated while the tower is cooled (it is assumed that tower 203 had been pre-heated in a previous cycle by passage of hot exhaust gases therethrough). The heated air leaves tower 203 by way of tower connection conduit 207 through valve 205b and conduit 211 and may be utilized, such as by ducting the air to serve as the preheated combustion air fed to system 10 via preheated air line 14. In a typical system the hot gases entering the cooling tower 201 are at a temperature of about 300°–350° C. and are cooled in the tower to about 40°–130° C., the precise temperature range selected depending upon whether or not it is desired to retain heat energy in the purified off gas for subsequent use. Stated otherwise, the temperature range to which the gas is cooled in tower 201 is approximately the temperature range at which the purified gases return from unit 58. If the gases are cooled to the range 40° C. to less than about 70° C., then the purified off gas at 40°–70° C. will not contain sufficient heat values to be useful and will have to be vented. On the other hand if the gases are cooled to the range 70° C. to 130° C. then the purified off gas at 70°–130° C. contains sufficient residual heat for use, such as in a heat exchanger as shown in FIG. 2. Thus, in the operation of the system of the present invention, there is a built-in option to retain sufficient residual heat energy in the purified off gas for subsequent use. In this connection, particularly where it is desirable to retain heat energy in the purified off gas, compressor 213 may be operated without the conventional after cooler in order that the heat energy added to the exhaust gas by the compressor is retained in the system and ultimately reclaimed from the purified off gas.

The exhaust gases from towers 201, 203 at 40°–130° C. are compressed in compressor 213 and enter unit 58. The cooled purified gases leaving unit 58 are discharged via line 220 and, depending upon their temperature, are either vented or utilized, such as in a heat exchanger shown in FIG. 2. The compressed air entering tower 203 via air feed line 221 is reheated in tower 203 to within 5° to 10° C. of the temperature of the gases entering tower 201. If for some reason it is not desired to reclaim the heat energy of the towers with a heat transfer fluid such as compressed air, instead of discharging the purified gases via line 220, the purified gases may be allowed to pass through the heated tower 203 wherein the gases would be reheated. The heat energy would then have to be reclaimed from the heated purified gas exiting the system through conduit 211, e.g., as is described in connection with copending application Ser. No. 962,103, filed Nov. 17, 1978.

The next cycle is like the one just described except that tower 203 now serves as the exhaust gas cooling tower and tower 201 as the compressed air heating tower. It will be appreciated that following the previous cycle, tower 201 was left in a relatively heated state by the passage of hot exhaust gases therethrough whereas tower 203 was left in a relatively cooled state by virtue of having given up its heat content to the compressed air passing therethrough. In this next cycle the hot exhaust gases flow from feed conduit 17a through valve 205a into tower 203 in which the gases are cooled while the tower is heated. They are then ducted via cross conduit 215 to compressor 213 in which they are compressed. The compressed gases are ducted through conduit 209 to feed conduit 53 for processing in gas treatment and separation unit 58. Following processing in unit 58, the purified gases leaving towers 59, 61, 63 through valves 64c are ducted via purified gas return conduit 210 and cross conduit 217 to discharge via line 220. The compressed air entering tower 201 via air feed line 221 is heated while the tower is cooled and the resulting heated air leaving tower 201 may be utilized if desired, as the combustion air fed to system 10 via preheated air line 14.

By feeding towers 201, 203 with exhaust gases at such high temperature levels of up to about 350° C., the boiler or combustion unit may eliminate the air preheater which typically occupies 60%–70% of the heat exchange surface of the unit (see FIG. 4). Moreover, the use of high thermal efficiency regenerators for the purpose of cooling the gas prior to purification and reclaiming the heat energy of the exhaust gas prior to discharge adds to the overall thermodynamic efficiency of the system while it simplifies the design and reduces capital costs.

Gas treatment and separation unit 58 is preferably of the same type described in U.S. Pat. No. 3,970,524 and is operable to separate the gases into condensable and noncondensable components by subliming or "freezing out" noxious, condensable components of relatively low volatility and components having similar vapor pressures, such as approximately between $C_2$ and $C_4$ fractions. The unit 58 includes three similar packed towers or columns 59, 61, 63. Each of the towers 59, 61, 63 is similar to a regenerator described by Russell B. Scott at pages 29–31 of *Cryogenic Engineering*, published in 1959 by D. Van Nostrand Co., Princeton, N.J. Each of the towers 59, 61, 63 contains loose solids, for example, ceramic balls, quartzite pebbles, steel shot, etc., pancakes wound from thin corrugated aluminum ribbon, or other solids having relatively large surface area to volume ratios, relatively high heat capacitances and the capability of storing heat and resisting corrosion. Typically, the packing for the regenerator towers has a surface area to volume ratio and packing capability sufficient that the regenerator has a surface of 1000 to 2000 square ft. per cubic foot.

Automatic switch valves 64a, 64b, 64c, and 65a, 65c are provided at opposite ends of the towers 59, 61, 63. Tower connection conduits 67, 68 communicate the towers 59, 61, 63 with the valves 64a, 64b, 64c and 65a, 65c, respectively.

The gas feeder conduit 53 connects with the valves 64a. An acid gas conduit 70 connects with the valves 64b. A vacuum pump 79 communicates with the acid gas conduit 70. A transfer conduit 80 communicates the pump 79 with a compressor 81. An acid gas discharge conduit 82 communicates with the compressor 81. A purified gas discharge conduit 210 connects with the valves 64c.

A pair of transfer conduits 73, 74 connect with the valves 65a, 65c. A cooling means, which could be a heat exchanger, but, if gas pressure is high enough is preferably an expansion turbine 75, communicates the transfer conduits 73, 74. An expansion turbine has the advantage that it cools the gas more efficiently by substantially isentropic expansion while at the same time it produces useful shaft work. To convert the shaft work to a more useful form of energy, a power generator 76 is coupled to the drive shaft of the turbine 75.

The manner by which gases are treated in the unit 58 may be visualized as that of subjecting the gases to several like cycles repeated time after time as long as exhaust gases are being produced by system 10. During each cycle, a different step is conducted simultaneously in each of the towers 59, 61, 63. While one of the towers is being cooled by a flow of cooled purified gas, separation is taking place in another tower, and condensed or sublimed components are being removed from the third tower.

A first step of one cycle is carried out by opening the valves 64a, 65a at each end of tower 59 and valves 64c, 65c at each end of tower 63. Gases will then flow through tower 59, will drive the turbine 75, and will flow through the tower 63. The gases expand in the turbine 75 and, as the gases expand, they are cooled. It is the flow of these cooled gases through the tower 63 that readies the tower 63 for a subsequent gas separation step. (It is assumed here that the tower 59 has already been pre-cooled in this manner in a previous cycle so that less volatile gas components loaded into the tower 59 will be sublimed or "frozen out".) The gases are allowed to flow in this manner for a short period of time, for example, for about 6 to 8 minutes. Energy extracted from these gases by the turbine 75 is used to drive the generator 76.

Gas cools in tower 59 due to contact with the large surface area of the cooler solids in the tower. Less volatile components of the gas are condensed or converted into the solid phase and remain in tower 59. The more volatile, noncondensed or clean components of the gas pass out of tower 59 and, via turbine 75, through tower 63. This clean gas is purified in the sense that it has been freed from the "frozen out", sublimed or condensed components. The turbine 75 expands the gas, thus further cooling it, and delivers the gas at a pressure of typically about 5 psig into tower 63. The pressure at which the gases enter the tower 63 is not critical. What is required is that the pressure ratio reduction effected in the turbine 75 is of sufficient magnitude to adequately cool the gases so the gases can properly chill the tower 63.

A second step (which is carried out simultaneously with the loading of exhaust gas into the tower 59 and the cooling of the tower 63) is that of cleaning a loaded tower by revaporizing the "frozen out," sublimed or condensed components remaining in that tower from a prior cycle. This step is carried out, for example in connection with tower 61, by closing the valves 65a and 65c at the lower end of tower 61 and by connecting the other end of that tower through valve 64b to the vacuum pump 79 and compressor 81. The pump 79 operates to reduce the pressure in the tower 61 by a ratio of about 10 to 1. As pressure in the tower is reduced, the "frozen out," sublimed or condensed components are revaporized to form an acid gas which is drawn out of the tower 61. The withdrawn acid gas is compressed by the compressor 81 and is discharged into the acid gas discharge conduit 82. The acid gas typically consists mainly of $CO_2$ with small amounts of $H_2S$, $SO_2$, $SO_3$, HCN and other noxious gases. Noxious gases, containing chlorine, sulfur, and the like, may be neutralized, as by scrubbing with caustic solution. Combustible components of the neutralized gases are preferably separated out and retained for use. Such gases can be burned in the combustion system 10.

The next cycle is like the one just described and consists of a first step of passing gases from the conduit 53 through one of the valves 64a into the cooled tower 63, separating, by "freezing out" or subliming, components of the gases in that tower, cooling the separated clean gas leaving tower 63 in the turbine 75 and passing the cooled, expanded clean gas through the recently cleaned tower 61 to chill that tower in preparation for receiving the next charge of exhaust gases from conduit 53. A second step is that of simultaneously revaporizing the "frozen out", sublimed or condensed components which remain in the tower 59 from the prior cycle to clean that tower in preparation for chilling during the next cycle.

The next cycle is like the two foregoing cycles. Its first step is that of passing gases from the conduit 53 into the tower 61 to separate out gaseous components and cooling the just cleaned tower 59 with the separated clean gas fraction from tower 61 and turbine cooling means 75. A second step is to clean tower 63 by revaporizing components remaining in the tower 63 from the previous cycle by withdrawing them through vacuum pump 79 and compressor 81.

The purified gases, which are relatively cool, discharged through valves 64c into the conduit 210 are discharged from the system via purified gas discharge conduit 220. These gases can, if desired, be exhausted to atmosphere without the use of a flue gas stack. Alternatively, if they contain sufficient heat values, e.g., their temperature is in the range 70° C. to 130° C., they can be used as a heat source in a heat exchanger, e.g., for preheating boiler feed water, domestic heating, etc. Even if the gases do not contain sufficient heat values, inasmuch as they are dry, they can be used to advantage in evaporative cooling towers and the like.

Noxious gases created in chemical processes other than combustion can be mixed with gases in the tower connection conduit 209 and treated in the unit 58. The optional addition of such gases is indicated by broken line 90 in FIG. 1. A sewerlike blow down system of gas collection conduits 101 can be used to collect exhaust gases from a plurality of gas producing apparatuses 102. Suitable compression equipment (not shown) can be included in the conduit system 101 to transfer the collected gases into the conduit 53.

Referring to FIG. 2, another embodiment of the present invention is illustrated in which the exhaust gases are subjected to treatment to separate them into condensable and noncondensable components by subliming or "freezing out". The combustion system and particulate matter separation units shown in FIG. 2 may be just like their counterpart units in FIG. 1. Thus, combustion system 110 is fueled from a fuel supply source 111 and air or oxygen is supplied to the combustion system 110 through air or oxygen supply line 112. Preferably air supply line 112 includes a compressor 113 to pressurize the air supply and to maintain the combustion system 110 operating under a positive pressure. Where available, preheated compressed air is supplied to combustion system 110 via air line 114. In this embodiment of the invention, where hot gases are treated throughout, downstream compressors are inefficient and, hence, undesirable. Therefore it is desirable that the gases in the gas treatment system are maintained under sufficient pressure by a compressor in the combustion system 110, such as compressor 113, or by a compressor located upstream of the combustion system 110.

Exhaust gases generated by the combustion system 110 are ducted via conduits 115, 116, 117 to, through and from a series of particle separation units 120, 121, 122. The separation unit 120 is preferably a cyclone separator, and particulate matter as small as 50 microns in size is separated out of the gases as indicated by an arrow 124. The separation units 121, 122 house filters which remove smaller particles as indicated by arrows 125, 126. The units 120, 121, 122 are insulated to avoid heat loss.

Exhaust gases, which have been cleaned of particulate matter are led from conduit 117 into gas feeder conduit 153 which directs the hot gases to gas separation and heat reclamation unit 158. These gases have a slightly reduced pressure due to pressure losses in the filters, but are at substantially the same temperature, as high as about 300°–350° C., as when they exited the combustion system 110. The unit 158 is operable: (1) to cool the hot gases and separate them into condensable components of relatively low volatility and more volatile components having similar vapor pressures, such as $C_3$ and $C_4$ fractions; and (2) to reheat the more volatile components and to heat a heat exchange fluid, such as compressed air, to a temperature which may be as high as within a few degrees of the temperature of the exhaust gases which entered unit 158 through feeder conduit 153. The more volatile, noncondensed or clean components of the gas exit unit 158 via purified gas (off gas) discharge conduit 172. The heated heat exchange fluid exits unit 158 via heated air discharge conduit 171.

Figure 3:
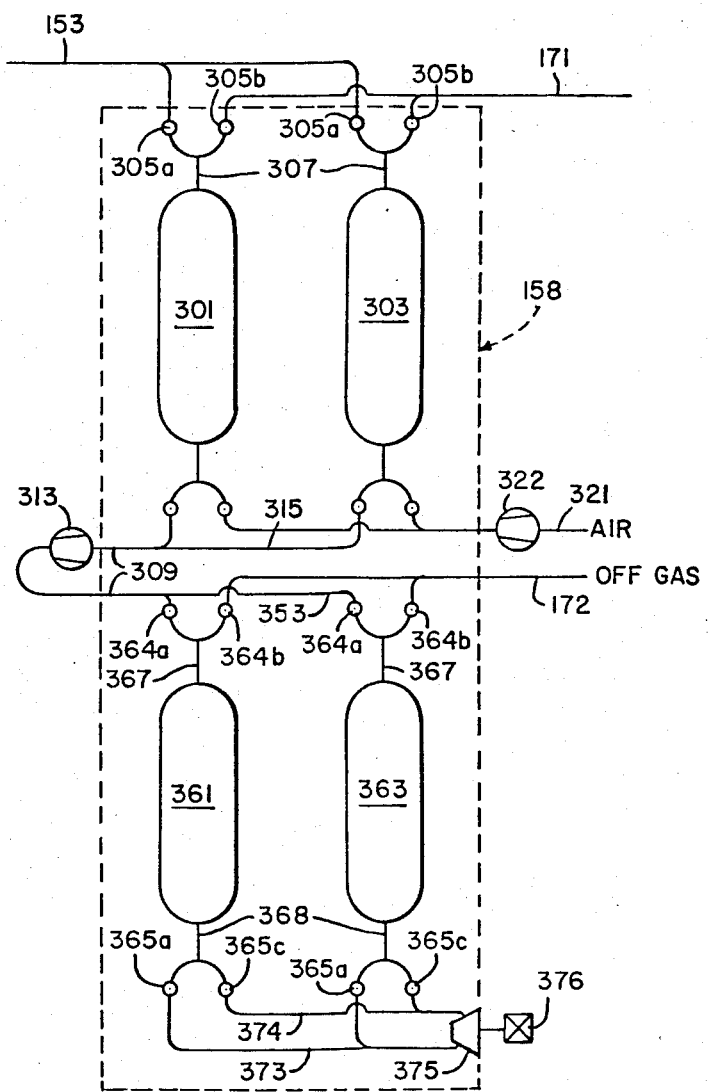
FIG. 3 is a schematic flow diagram of an illustrative gas separation and heat reclamation unit for use in the FIG. 2 embodiment of the present invention.

Referring to FIG. 3 there is shown an illustrative gas separation and heat reclamation unit 158, useful, for example, in the embodiment of FIG. 2. The unit of FIG. 3 uses separate regenerators to perform the four essential functions of unit 158, i.e., to cool the hot exhaust gas, to separate components of the gas, to reheat the relatively cool purified off gas prior to venting or utilizing, and to reclaim thermal energy by heating the compressed air heat transfer fluid. Unit 158 of FIG. 3 accomplishes its functions with a first heat exchange zone comprising a plurality (two are illustrated) of series arranged regenerator units 301, 361 to cool the exhaust gas and separate it into its components and a second heat exchange zone comprising a plurality (two are illustrated) of series arranged regenerator units 303, 363 to reheat the relatively cool purified off gas and to reclaim thermal energy by heating a heat transfer fluid. Either set of series arranged regenerator units 301, 361 or 303, 363 can serve as the first heat exchange zone and perform the functions of that zone. Likewise, either set can serve as the second heat exchange zone and perform the functions of that zone. Thus, regenerators 301, 303 comprising a first heat exchange sub-zone are arranged in parallel relationship to allow the exhaust gas to be introduced initially into either one of regenerators 301, 303 and to allow either one to perform the hot exhaust gas cooling function while the other performs the heat reclamation function. Likewise, regenerators 361, 363 comprising a second heat exchange sub-zone are arranged in parallel relationship to allow either one to perform the component separation function while the other performs the off gas reheating function.

Exhaust gases which have been cleaned of particulate matter are led into gas feeder conduit 153 from which they pass into exhaust gas separation and heat reclamation unit 158. Unit 158 includes at least four similar packed towers or columns 301, 303, 361, 363. Towers 301 and 303 are arranged in parallel relationship to each other, as are towers 361 and 363. However towers 301, 303 are arranged in series relationship to towers 361, 363. Each of the towers 301, 303, 361, 363 is similar in construction and content to the regenerators shown as 59, 61, 63 in FIG. 1. Automatic switch valves 305a, 305b are provided at the end of towers 301, 303 adjacent to feeder conduit 153 with valves 305a connecting thereto. Tower connection conduits 307 communicate the towers 301, 303 with the valves 305a, 305b. Tower connection conduit 309 through cross conduit 315 communicates with towers 301, 303 and connects towers 301, 303 with feed conduit 353 and automatic switch valves 364a, 364b provided at the end of towers 361, 363 adjacent feed conduit 353. Tower connection conduit 367 communicates the towers 361, 363 with the valves 364a, 364b. Tower connection conduit 368 communicates the towers 361, 363 with automatic switch valves 365a, 365c. A pair of transfer conduits 373, 374 connect valves 365a, 365c of towers 361, 363 with a cooling means, preferably an expansion turbine 375. An expansion turbine has the advantage that it cools the gas more efficiently by substantially isentropic expansion while at the same time it produces useful shaft work. A power generator 376 may be coupled to turbine 375 to convert the shaft work to a more useful form of energy. In an alternative embodiment (not shown), transfer conduits 373, 374 could connect the valves 365a, 365c with a noxious gas removal system, such as a system which removes environmental pollutants by use of conventional absorption, extraction and/or adsorption means and which operates at relatively low temperatures, e.g., about −40° to −50° C. In the illustrated system, purified off gas is discharged following component separation in tower 361 and reheating in tower 363 through purified off gas discharge conduit 172. A preheated compressed air discharge conduit 171 connects with the valves 305b. A compressed air feed line 321 and compressor 322 supply a cooling heat exchange fluid to towers 301, 303. A compressor 313 is included in tower connection conduit 309 to provide the positive pressure in the system which is almost invariably required when very large exhaust gas volumes are passed.

The manner by which gases are treated in unit 158 may be visualized as that of subjecting the gases in successive like cycles to cooling in towers 301, 303 and reheating and/or cooling in towers 361, 363. During each cycle, a different step is being conducted in each of towers 301, 303. While a first tower is serving as the cooling tower to cool the hot gases, the other tower is serving to heat the compressed air flowing therethrough via air feed line 321. In the next cycle, the roles of the respective towers 301, 303 are reversed. Likewise with towers 361, 363. While one of these towers is serving as the component separation tower to separate the less volatile gas components by sublimation or condensation from the cooled gases flowing from towers 301, 303, the other tower serves to reheat the more volatile, noncondensed or clean components of the gas passing out of the component separation tower. In the next cycle, the roles of the respective towers 361, 363 are reversed.

Thus in a first cycle one of the towers 301, 303 is selected as the cooling tower into which the hot particle free exhaust gases are ducted and the corresponding valve 305a is opened. If tower 301 is to serve as the cooling tower, valve 305a associated therewith and valve 305b associated with tower 303 are opened while valve 305b associated with tower 301 and valve 305a associated with tower 303 remain closed. The hot exhaust gases flow from feeder conduit 153 through valve 305a into tower 301 in which the gases are cooled prior to compression in compressor 313. At the same time the tower 301 is heated by the hot gases in preparation for serving as the air heating tower in the next cycle. The compressed gases are then directed by conduit 309 to feed conduit 353 for component separation in towers 361 or 363. When tower 361 is to serve as the component separation tower valve 364a associated therewith and valve 364b associated with tower 363 are opened while valve 364b associated with tower 361 and valve 364a associated with tower 363 remain closed. The relatively cooled compressed exhaust gases flow from feed conduit 353 through valve 364a into tower 361 in which the gaseous components are further cooled and separated by sublimation or condensation with the less volatile components remaining in tower 361 while the more volatile or purified components pass through the tower. (It is assumed here that towers 301 and 361 had already been precooled in a previous cycle so that the gases will be cooled in tower 301 and less volatile gas components loaded into tower 361 will be sublimed or "frozen out".) At the same time the tower 361 is heated by the relatively cool exhaust gases in preparation for serving as the purified gas reheating tower in the next cycle. The gas, freed of the less volatile components, flows via valve 365a and transfer conduit 373 through turbine 375 wherein the gas is further cooled. The exhaust gases are allowed to flow through towers 301 and 303 in this manner for a short period of time, for example, for about 6 to 10 minutes. Energy extracted from the gases by turbine 375 is used to drive the generator 376. The gases expand in the turbine and are cooled as they expand. The expansion pressure ratio in the turbine need only be sufficient to accomplish the desired cooling. In view of this additional pressure drop, a system which utilizes an expansion turbine will generally operate at a somewhat higher combustion system pressure as compared to a system which utilizes some other means of cooling the exhaust gas, such as a conventional heat exchanger.

The further cooled purified gases are returned through tower 363 via transfer conduit 374 and valve 365c. In tower 363 the purified gases are reheated to the relatively cool condition while the tower is cooled (it is assumed that tower 363 had been pre-heated in a previous cycle by passage of relatively cool exhaust gases therethrough). The relatively cool purified gases leave tower 363 through tower connection conduit 367 and valve 364b and are discharged via purified off gas discharge conduit 172. If the off gas contains sufficient thermal energy values, as will hereinafter be discussed, then its thermal content may be reclaimed. If the off gas contains insufficient thermal energy it is generally vented to ambient.

It will be appreciated that in the immediately previous cycle, tower 363 had been used for the sublimation or "freezing out" step and the less volatile components of the gas had been condensed or converted into the solid phase and had remained within tower 363, i.e., the tower was loaded. To clean loaded tower 363 by revaporizing the "frozen out", sublimed or condensed components from the prior cycle to form an acid gas, the initial flow of purified gas which passes through loaded tower 363 is used to purge the tower. The mixed flow of purified gas and revaporized components, i.e., acid gas, as shown in FIG. 2, are ducted through compressor 182 via purified gas discharge conduit 172 and valve 169a into the blowdown conduit 193a. The acid gas typically consists mainly of $SO_2$ and $CO_2$ with small amounts of $H_2S$, $SO_3$, HCN and other noxious gases. Inasmuch as flue gas discharge restrictions preclude emission of these gases, most noxious components in the blowdown gases are neutralized by scrubbing or are otherwise separated out to permit exhausting the cleansed blowdown gas. Cleaning of the loaded tower in this manner can be accomplished during each cycle by switching the initial purified gas flow to the blowdown line 193a via valve 169a for just enough time to purge the tower and then switching the purified gas flow back through valve 169b to either be vented via gas path 193b, valve 183a, line 195 and vent line 194 or, if the purified off gas contains sufficient thermal energy to be used as a thermal source for heating water or other heat exchange medium, via heat exchanger 196, as will be discussed more fully hereinafter.

The heat energy stored in tower 303 is recovered by passing compressed air through air feed line 321 and compressor 322 into and through tower 303 in which the air is heated while the solid packing in tower 303 is cooled (it is assumed that tower 303 had been preheated in a previous cycle by passage of hot exhaust gases therethrough). The heated air leaves tower 303 by way of tower connection conduit 307 through valve 305b and conduit 171 and may be utilized, such as by ducting the air to serve as the preheated combustion air fed to system 110 via preheated air line 114 as shown in FIG. 2 and/or for other purposes, as will be more fully discussed hereinafter. It is the flow of cool compressed air through tower 303 which readies that tower for the next cycle during which gas cooling will take place therein.

As can be seen most clearly in FIG. 2, the heated compressed air in conduit 171 can be diverted through optional expansion turbine 130 (shown in phantom) to generate shaft work or electrical energy via optional power generator 132 (shown in phantom). The expanded and cooled air exiting turbine 130 is generally discharged to ambient, but could be reused if desired. In still another alternative or additional use, the heated air may be used as a thermal energy source in a heat exchanger to directly heat water or other heat exchange fluid. For example, an optional heat exchanger 185 may be provided into which cold water is fed via feed line 184 by pump 192. The water is heated by closing or throttling valve 190b and directing the heated compressed air into heat exchanger 185 through valve 190a and heating coils or sparger 186. The cooled air is vented from heat exchanger 185 through vent line 191. Heated water is pumped from heat exchanger 185 through line 187 by pump 188. It will, of course, be appreciated that the heating values of the heated air can be used to heat a recyclable, preferably water immiscible, intermediate heat exchange fluid, which can then be used to heat water or other medium.

In a typical system the hot gases entering the cooling tower 301 are at a temperature of about 300°–350° C. and are cooled in the tower to about 40°–130° C. (relatively cool condition) at which temperature the gases are compressed and passed to tower 361 in which they are cooled to about −100° to −140° C. the temperature at which component separation occurs. The purified gases leaving tower 361, which may be further cooled in turbine 375, are reheated in tower 363 to within 5° to 10° C. of the temperature of the gases entering tower 361 prior to discharge through line 172 for heat reclamation, venting, etc. If the purified gases leaving tower 361 are in the range 40° C. to less than about 70° C., then the purified off gas will not contain sufficient heat values to be useful and will likely have to be vented. On the other hand, if the gases are in the range of 70° C. to 130° C., then the purified off gas generally contains sufficient residual heat for use, such as the heat source in a heat exchanger. The compressed air entering tower 303 via air feed line 321 may be heated in tower 303 to within 5° to 10° C. of the temperature of the gases entering tower 301. If for some reason it is not desired to reclaim the bulk of the heat energy of the towers with a heat transfer fluid such as compressed air, then provision can be made for directing the purified gases through heat energy-containing tower 303 wherein the gases would be reheated. The heat energy would then have to be reclaimed from the heated purified gas exiting the system through conduit 171, e.g., as is described in connection with copending application Ser. No. 962,103, filed Nov. 17, 1978.

Thus it can be seen that the system of the present invention offers a choice in the manner of reclaiming the heat energy of the exhaust gases. Heat energy may be reclaimed by thermal exchange between the compressed air flow passed through the tower and the relatively hot tower solids. Alternatively, heat energy may be reclaimed from the relatively cooled purified off gases exiting the system through discharge conduit 172 if they have been reheated sufficiently to achieve a temperature range at which the heat values of the gases may usefully and efficiently be reclaimed. If it is not desired to reclaim heat energy via the purified off gas, the purified off gas flow may be vented. On the other hand, heat energy may usefully be reclaimed if the off gas is at a temperature in the range from about 70° C. to 130° C. Thus, as shown in FIG. 2, the purified off gas may be ducted through valve 169b, line 193b and valve 183b into heat exchanger 196 where the gas gives up its heat energy in coils or sparger 179 before being vented from the heat exchanger via vent line 194 as cooled off gas. In this case it is desirable to retain as much heat energy as possible in the purified off gas. Thus, compressor 182 may be operated without the conventional after cooler in order that the heat energy added to the exhaust gas by the compressor is retained in the system and ultimately reclaimed from the purified off gas. Cold water, for example, may be fed to heat exchanger 196 via line 177 and pump 178 to absorb the heat energy from the off gas and heated water pumped from heat exchanger 196 via line 180 and pump 181. It will, of course, be appreciated that the heating values of the off gas can be used to heat a recyclable, preferably water immiscible, intermediate heat exchange fluid which can then be recycled or used to heat water or other medium. The balance of the heat energy in towers 301, 303, i.e., the portion not absorbed by the purified gas, is removed directly from the heated tower solids using a heat transfer fluid, e.g., compressed air, other than the purified gases. The heated fluid exiting the towers via line 171 may be utilized in the manners previously described herein, such as for combustion feed air or as a thermal energy source in a heat exchanger.

The next cycle is like the one just described except that tower 303 serves as the exhaust gas cooling tower and tower 301 as the air heating tower. It will be appreciated that following the previous cycle, tower 301 was left in a relatively heated state by the passage of hot exhaust gases therethrough whereas tower 303 was left in a relatively cooled state by virtue of having given up its heat content to the compressed air passing therethrough. The hot exhaust gases flow from feeder conduit 153 through valve 305a into tower 303 in which the gases are cooled while the tower is heated. They are then ducted via cross conduit 315 to compressor 313 in which they are compressed. The compressed gases are ducted through conduit 309 to feed conduit 353 for component separation in tower 363 prior to further cooling in turbine 375. It will be appreciated that following the previous cycle, tower 361 was left in a relatively heated state by the passage of the relatively cooled exhaust gases therethrough whereas tower 363 was left in a cooled state by virtue of having given up its heat content to the cold purified gases passing therethrough. The relatively cooled exhaust gases flow from feed conduit 353 through valve 364a into tower 363 in which the gaseous components are further cooled and separated by sublimation or condensation while the tower 363 is heated. Following processing in tower 363 the purified gases are ducted through turbine 375, wherein they are still further cooled, to tower 361 wherein they are reheated to the relatively cool condition, while the tower is cooled and purged of "frozen out", sublimed or condensed components from the prior cycle. The purified or mixed gases are then discharged from the system via purified off gas discharge conduit 172 for further processing of revaporized components, venting, heat reclamation, and the like.

By feeding towers 301, 303 with exhaust gases at such high temperature levels of up to about 350° C., the boiler or combustion unit may eliminate the air preheater which typically occupies 60%–70% of the heat exchange surface of the unit. The use of regenerators for the purpose of cooling the gas prior to purification and reclaiming the heat energy of the exhaust gas prior to discharge adds to the thermodynamic efficiency of the system while it simplifies the design and reduces capital costs. Capital costs can be further reduced by utilizing a gas separation and heat reclamation unit 158 which employs only two towers, each necessarily serving a dual function. Each tower is effectively a split regenerator wherein separate upper and lower portions perform separate functions. Thus, while a first tower is being cooled in an upper portion thereof by a flow of relatively cool compressed air and in a lower portion thereof by the flow of cold purified off gas, initial cooling of the hot exhaust gas is taking place in an upper portion of the second tower and component separation by sublimation or condensation is taking place in a lower portion of the second tower. Condensed or sublimed components are removed from the lower portion of the second tower at the beginning of the next cycle by the initial flow of purified gas therethrough.

Figure 5:
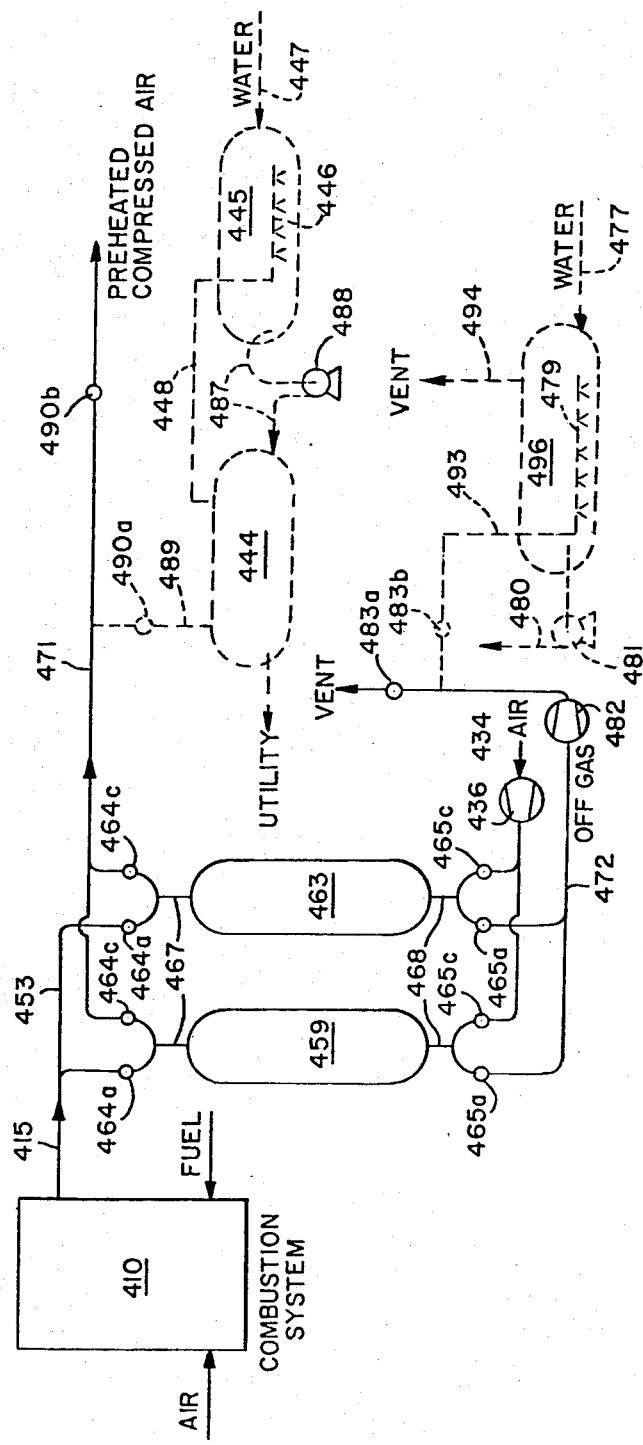
FIG. 5 is a schematic flow diagram of a system for practicing still another embodiment of the present invention.

With minor modification the system of FIG. 2 is equally useful for heat reclamation from a hot clean exhaust gas, see FIG. 5, such as a gas resulting from combustion of a clean fuel such as $CH_3OH$ or clean natural gas, which contain no harmful contaminants. Such a gas would not require particle separation units and could pass from the combustion system 410 directly to a heat reclamation unit 458, there being no need for a gas separation function. Therefore, regenerator towers 459, 463 could serve exclusively as highly efficient heat transfer units for the reclamation of thermal energy from the hot exhaust gas.

In the operation of the embodiment illustrated in FIG. 5 the clean, hot exhaust gases from combustion system 410 pass via conduit 415 into gas feeder conduit 453 and then into one of towers 459, 463 wherein the hot gases give up heat to the high heat capacitance solids therein and become cooled, preferably to about ambient temperature. At the same time, the thermal energy content of the other tower 459, 463 (it having been heated by the passage of hot exhaust gases therethrough in a previous cycle) is recovered by passage of a heat exchange fluid, e.g., compressed air, therethrough. A first step of one cycle is carried out by opening the valves 464a, 465a at each end of tower 459 and valves 464c, 465c at each end of tower 463. The hot exhaust gases will then flow from feeder conduit 453 via valve 464a through tower 459 in which the gases cool. The cooled gases exit tower 459 via valve 465a and off gas discharge line 472. The cooled off gas may either be vented through valve 483a or utilized to reclaim heat values therefrom. To recover heat values from the off gas, the gas may be ducted through compressor 482, valve 483b and line 493 into heat exchanger 496 where the gas gives up its heat energy in coils or sparger 479 before being vented from the heat exchanger via vent line 494. In this case it is desirable to retain as much heat as possible in the off gas. Thus, compressor 482 may be operated without the conventional after cooler in order that the heat energy added to the exhaust gas by the compressor is retained in the system and ultimately reclaimed from the purified off gas. Cold water for example may be fed to heat exchanger 496 via line 477 to absorb the heat energy from the off gas and heated water pumped from heat exchanger 496 via line 480 and pump 481. It will, of course, be appreciated that the heating values of the off gas can alternatively be used to heat a recyclable, preferably water immiscible, intermediate heat exchange fluid which can then be recycled or used to heat water or other medium.

It will, likewise, be appreciated that as the exhaust gases cool in passing through tower 459, the tower solids are heated. The heat stored in the tower solids may be recovered by feeding a cool heat exchange fluid, such as ambient temperature compressed air, from air feed line 434 and compressor 436 into tower 463. The flow of air cools the solid packing in tower 463 as it passes therethrough and becomes heated itself as it does so. (It is assumed here that the tower 463 had been preheated in a previous cycle by the flow of hot exhaust gases therethrough). It is the flow of cool compressed air through tower 463 that readies the tower for the next cycle during which exhaust gas cooling will take place therein. The heated air may be used as preheated combustion air in the combustion system 410, to operate a power turbine (not shown) or as the thermal energy source in a heat exchanger to directly heat water or other heat exchange fluid. For example, optional heat exchangers 444, 445 may be provided into which cold water is fed via feed line 447. The water is initially heated at ambient pressure almost to its vaporization point by direct heat exchange in heat exchanger 445 and the thus heated water is pumped from heat exchanger 445 via line 487 and pump 488 into heat exchanger 444. Heat exchanger 444 is maintained at an elevated pressure, e.g., 28 psig, and a temperature of about 130° C., for further heating and degassing of the water prior to utilization, for example as feed water to the economizer section of a steam generator or to a district heating system. The heated compressed air is fed initially through heat exchanger 444 by closing or throttling valve 490b and directing the air into the heat exchanger via valve 490a and line 489. From heat exchanger 444 the air is directed into heat exchanger 445 via line 448 and sparger 446. Cooled air is vented as necessary from heat exchanger 445. It will, of course, be appreciated that the heating values of the heated air can be used to heat a recyclable, preferably water immiscible, intermediate heat exchange fluid, which can then be used to heat water or other medium.

While the invention has been described with reference to particular embodiments thereof it will be understood that numerous modifications may be made by those skilled in the art without actually departing from the scope of the invention. For example, the methods and systems illustrated in FIGS. 1, 2 and 3 are effective to reduce the impurity levels in the purified gas to trace levels. Should it be desired to completely remove all sulfurous compounds and other harmful components, adsorption or absorption systems can be linked, in known manner, to the systems of FIGS. 1, 2 and 3. Accordingly all modifications and equivalents may be resorted to which fall within the scope of the invention as claimed.

I claim:

1. In a power generating system for producing energy from steam, including furnace means for generating thermal energy-containing hot gases containing environmentally harmful components and boiler means for utilizing the thermal energy of the hot gases for converting feed water to steam, the improvement comprising:

boiler means consisting essentially of economizer means, superheater means, reheater means, convection and radiation heater means, said hot gases containing environmentally harmful components exiting said boiler means after passage through said economizer means;

means for treating said hot gases containing environmentally harmful components to separate said components and recover at least a portion of the residual thermal energy of said gases; and means for directing said hot gases to said treating means from said economizer means without substantial cooling therebetween;

said treating means comprising (a) separator means for removing particulate matter from said hot gases;

(b) first heat exchange means for passing said gases into direct heat exchange relationship with a relatively cool, relatively high heat capacitance solid material to exchange heat between said gases and said solid material, whereby said hot gases are passed through said first heat exchange means to concurrently cool said gases and heat said solid material;

(c) means for separating environmentally harmful components of said cooled gases from the balance thereof by separating the cooled gases into less volatile and more volatile components;

(d) second heat exchange means for passing a fluid into direct heat exchange relationship with a relatively hot, relatively high heat capacitance solid material to exchange heat between said fluid and said material, whereby a heat transfer fluid is passed through said second heat exchange means to concurrently cool said solid material and heat said fluid.

2. In a power generating system for producing energy from steam, including furnace means for generating thermal energy-containing hot gases containing environmentally harmful components and boiler means for utilizing the thermal energy of the hot gases for converting feed water to steam, the improvement comprising:

boiler means consisting essentially of economizer means, superheater means, reheater means, convection and radiation heater means, said hot gases containing environmentally harmful components exiting said boiler means after passage through said economizer means;

means for treating said hot gases containing environmentally harmful components to separate said components and recover at least a portion of the residual thermal energy of said gases; and means for directing said hot gases to said treating means from said economizer means without substantial cooling therebetween;

said treating means comprising (a) separating means for removing particulate matter from said hot gases;

(b) first heat exchange means for passing said gases into direct heat exchange relationship with a relatively high heat capacitance solid material to exchange heat between said gases and said solid material, whereby said hot gases are passed through said first heat exchange means to concurrently cool said gases and heat said solid material;

(c) means for separating said cooled gases into less volatile and more volatile components;

(d) discharge means for discharging the more volatile components of said gases to atmosphere;

(e) recovery means for recovering and processing the less volatile components of said gases;

(f) compressor means for compressing said gases at a point upstream of said recovery means; and (g) second heat exchange means for passing a fluid into direct heat exchange relationship with a relatively high heat capacitance solid material to exchange heat between said fluid and said solid material, whereby a heat transfer fluid is passed through said second heat exchange means to concurrently cool said solid material and heat said fluid.

3. A power generating system, as claimed in claim 2, wherein said first and second heat exchange means are arranged in parallel relationship and including means for directing said hot exhaust gas and said heat transfer fluid, alternately, to said first and second heat exchange means whereby said hot gas is directed to said heat exchange means containing relatively cool solid material and said fluid is directed to said heat exchange means containing relatively hot solid material.

4. A power generating system, as claimed in claims 2 or 3, including third and fourth heat exchange means arranged in parallel relationship to each other, said third and fourth heat exchange means arranged in series relationship with said first and second heat exchange means such that flow through said heat exchange means passes, sequentially, through said first, third, fourth and second heat exchange means, each of said third and fourth heat exchange means comprising means for passing a gas into direct heat exchange relationship with a relatively high heat capacitance solid material, whereby said hot exhaust gas is passed sequentially through said first and third heat exchange means to concurrently cool said gas and heat said solid materials therein, said more volatile components of said gas are separated from said less volatile components in said third heat exchange means and passed through said fourth heat exchange means to concurrently reheat said more volatile components of said gas and cool said solid material therein and a heat transfer fluid is passed through said second heat exchange means to concurrently heat said fluid and cool said solid material therein.

5. A power generating system as claimed in claim 4, further including purified gas heat reclamation means for recovering said reheated more volatile components of said gas and for recovering at least a portion of the thermal energy content thereof.

6. A power generating system, as claimed in claim 4, wherein each of said heat exchange means comprises a regenerator tower containing said relatively high heat capacitance solid material.

* * * * *